United States Patent
Tang (10) Patent No.: US 11,234,261 B2
(45) Date of Patent: Jan. 25, 2022

(54) DATA PROCESSING METHOD AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 69 days.

(21) Appl. No.: 16/628,922

(22) PCT Filed: Sep. 22, 2017

(86) PCT No.: PCT/CN2017/103022
§ 371 (c)(1),
(2) Date: Jan. 6, 2020

(87) PCT Pub. No.: WO2019/056325
PCT Pub. Date: Mar. 28, 2019

(65) Prior Publication Data
US 2020/0146043 A1    May 7, 2020

(51) Int. Cl.
| H04W 72/12 | (2009.01) |
| H04W 76/11 | (2018.01) |
| H04W 72/04 | (2009.01) |
| H04W 80/02 | (2009.01) |
| H04W 76/15 | (2018.01) |
| H04L 12/707 | (2013.01) |

(52) U.S. Cl.
CPC ......... *H04W 72/1289* (2013.01); *H04L 45/24* (2013.01); *H04W 72/042* (2013.01); *H04W 76/11* (2018.02); *H04W 76/15* (2018.02); *H04W 80/02* (2013.01)

(58) Field of Classification Search
CPC ........... H04W 72/1289; H04W 72/042; H04W 76/15; H04W 76/11; H04W 80/02; H04L 45/24
USPC ......................................................... 370/329
See application file for complete search history.

(56) References Cited

U.S. PATENT DOCUMENTS 9,531,506 B2 * 12/2016 Kim ................ H04L 1/1812
2015/0327249 A1 11/2015 Kitazoe et al.
(Continued)

FOREIGN PATENT DOCUMENTS

| CN | 106465243 A | 2/2017 |
| CN | 106470503 A | 3/2017 |

(Continued)

OTHER PUBLICATIONS

European search report issued in corresponding European application No. 17926223.3 dated Jun. 19, 2020.
(Continued)

*Primary Examiner* — Peter G Solinsky
(74) *Attorney, Agent, or Firm* — Young Basile Hanlon & MacFarlane, P.C.

(57) ABSTRACT

A data processing method and a related device are provided. The method comprises: a user equipment receives control information from a first network node; and the user equipment determines a data replication behavior of the user equipment according to the control information of the first network node and a set rule.

11 Claims, 5 Drawing Sheets

(56) References Cited

U.S. PATENT DOCUMENTS

| | | | |
|---|---|---|---|
| 2016/0255619 | A1 | 9/2016 | Yi et al. |
| 2018/0042028 | A1* | 2/2018 | Nam .................... H04B 7/0626 |
| 2018/0176909 | A1* | 6/2018 | Wikstrom ............ H04W 72/042 |
| 2019/0044663 | A1* | 2/2019 | Rosa .................... H04L 1/1809 |
| 2019/0081739 | A1* | 3/2019 | Nammi ................. H04L 1/1858 |
| 2020/0015120 | A1* | 1/2020 | Lin ....................... H04L 5/0044 |
| 2020/0022213 | A1* | 1/2020 | Han ................... H04W 28/0268 |
| 2020/0059821 | A1* | 2/2020 | Wirth ................... H04L 1/1851 |
| 2020/0092870 | A1 | 3/2020 | Tang |

FOREIGN PATENT DOCUMENTS

| | | |
|---|---|---|
| CN | 106817777 A | 6/2017 |
| CN | 107147479 A | 9/2017 |
| WO | 2015115854 A1 | 8/2015 |
| WO | 2015117481 A1 | 8/2015 |

OTHER PUBLICATIONS

European search report issued in corresponding European application No. 18858937.8 dated Apr. 24, 2020.
3GPP TSG-RAN WG2 Meeting #99; Berlin, Germany, Aug. 21-25, 2017; R2-1709029.
3GPP TSG-RAN WG2 #99; Berlin, Germany, Aug. 21-25, 2017; R2-1708331.
3GPP TSG-RAN WG2 #99; Berlin, Germany, Aug. 21-25, 2017; R2-1708769.
3GPP TSG RAN WG2 #99; Berlin, Germany, Aug. 21-25, 2017; R2-1707712.
3GPP TSG-RAN WG2 #97 Tdoc R2-1702032; Athens, Greece, Feb. 13-17, 2017.
Communication pusuant to Article 94(3) EPC Examination for EP Application 17926223.3 dated Mar. 11, 2021.
India First Examination Report for IN Application 201917054312 dated Mar. 31, 2021.
India First Examination Report for IN Application 202017001788 dated Mar. 30, 2021.
3GPP TSG-RAN WG2 #99 R2-1708769; Berlin, Germany, Aug. 21-25, 2017.
Korean Office Action with English Translation for KR Application 10-2020-7004545 dated Jun. 25, 2021. (9 pages).
Notice of Allowance for U.S. Appl. No. 16/630,637 dated May 27, 2021. (23 pages).
Korean Notice of Final Rejection with English Translation for KR Application 1020207004545 dated Sep. 1, 2021. (3 pages).
Communication pursuant to Article 94(3) EPC for EP Application 17926223.3 dated Oct. 7, 2021. (4 pages).
Indian Examination Report for IN Application 201917054312 dated Sep. 2, 2021. (2 pages).

* cited by examiner

DATA PROCESSING METHOD AND RELATED DEVICE

CROSS-REFERENCE TO RELATED APPLICATION(S)

This application is a 371 application of International Application No. PCT/CN2017/103022, filed on Sep. 22, 2017, the entire disclosure of which is hereby incorporated by reference.

TECHNICAL FIELD

The present application relates to the field of communication technology, in particular to a data processing method and a related device.

BACKGROUND

Under a Dual Connectivity (DC), a data duplication and transmission mode adopts a split bearer protocol architecture. For uplink and downlink, a Packet Data Convergence Protocol (PDCP) layer is located in a certain Cell Group (CG), such as a Master Cell Group (MCG) or a Secondary Cell Group (SCG), and the CG is an anchor CG. The PDCP layer of a sending end device duplicates a PDCP Protocol Data Unit (PDU) into two same PDCP PDUs, for example, one is the PDCP PDU and the other is a Duplicated PDCP PDU. The two PDCP PDUs pass through Radio Link Control (RLC) layers and Media Access control (MAC) layers of different CGs, and reach a corresponding MAC layer and RLC layer of a receiving end device through an air interface respectively, and finally are converged at a PDCP layer. When the PDCP layer detects that two PDCP PDUs are the same PDU, the PDCP layer discards one of the two PDCP PDUs and submits the other PDU to a higher layer.

SUMMARY

Implementations of the present application provide a data processing method and a related device, to determine a data duplication operation of a user equipment.

In a first aspect, an implementation of the present application provides a data processing method. The method includes: a user equipment receives control information from a first network node, and the user equipment determines a data duplication operation of the user equipment according to the control information from the first network node and a set rule.

In a second aspect, an implementation of the present application provides a data processing method. The method includes: a network node sends control information to a user equipment, wherein the control information is used for the user equipment to determine a data duplication operation of the user equipment in combination with a set rule.

In a third aspect, an implementation of the present application provides a user equipment which includes a processing unit and a communication unit. Herein the processing unit is configured to receive control information from a first network node through the communication unit, and determine a data duplication operation of the user equipment according to the control information from the first network node and a set rule.

In a fourth aspect, an implementation of the present application provides a network node which includes a processing unit and a communication unit. Herein the processing unit is configured to send control information to a user equipment through the communication unit, wherein the control information is used for the user equipment to determine a data duplication operation of the user equipment in combination with a set rule.

In a fifth aspect, an implementation of the present application provides a user equipment which includes one or more processors, one or more memories, one or more transceivers, and one or more programs. The one or more programs are stored in the one or more memories and configured to be executed by the one or more processors. The one or more programs include instructions for performing acts in the method as described in the first aspect.

In a sixth aspect, an implementation of the present application provides a network node which includes one or more processors, one or more memories, one or more transceivers, and one or more programs. The one or more programs are stored in the one or more memories and configured to be executed by the one or more processors. The one or more programs include instructions for performing acts in the method as described in the second aspect.

In a seventh aspect, an implementation of the present application provides a computer readable storage medium storing a computer program for electronic data interchange. The computer program causes a computer to perform the method of the first aspect.

In an eighth aspect, an implementation of the present application provides a computer readable storage medium storing a computer program for electronic data interchange. The computer program causes a computer to perform the method of the second aspect.

In a ninth aspect, an implementation of the present application provides a computer program product. The computer program product includes a non-transitory computer readable storage medium storing a computer program, and the computer program is operable to cause a computer to perform the method of the first aspect.

In a tenth aspect, an implementation of the present application provides a computer program product. The computer program product includes a non-transitory computer readable storage medium storing a computer program, and the computer program is operable to cause a computer to perform the method of the second aspect.

These aspects and other aspects of the present application will be more easily understood from following descriptions of the implementations.

BRIEF DESCRIPTION OF DRAWINGS

To describe technical solutions of implementations of the present application more clearly, accompanying drawings that need to be used in descriptions of the implementations will be briefly introduced below. It is apparent that the accompanying drawings described below are only some implementations of the present application. For a person of ordinary skill in the art, other drawings may be obtained according to these drawings without paying an inventive effort.

DETAILED DESCRIPTION

For one skilled in the art to better understand solutions of the present application, technical solutions in implementations of the present application will be described clearly and completely below with reference to the drawings in the implementations of the present application. It is apparent that the described implementations are only a part, but not all, of the implementations of the present application. According to the implementations of the present application, all other implementations obtained by a person of ordinary skill in the art without paying an inventive effort should fall within the protection scope of the present application.

Details are given below respectively.

Terms "first", "second", "third" and "fourth", or the like in the specification, claims and drawings of the present application are used to distinguish different objects and not used to describe a specific order. In addition, terms "include" and "have" and any variations thereof are intended to cover non-exclusive inclusion. For example, a process, method, system, product, or device that includes a series of acts or units is not limited to the listed acts or units, but optionally further includes acts or units that are not listed, or optionally further includes other acts or units that are inherent to the process, method, product, or device.

The "implementation" mentioned in this disclosure means that a particular feature, structure, or characteristic described in combination with the implementation may be included in at least one implementation of the present application. The appearance of the term in various places of the specification does not necessarily refer to the same implementation, nor is it an independent implementation mutually exclusive with other implementations or an alternative implementation. It is explicitly and implicitly understood by one skilled in the art that implementations described in this disclosure may be combined with other implementations.

Implementations of the present application will be described below with reference to the accompanying drawings.

Figure 1:
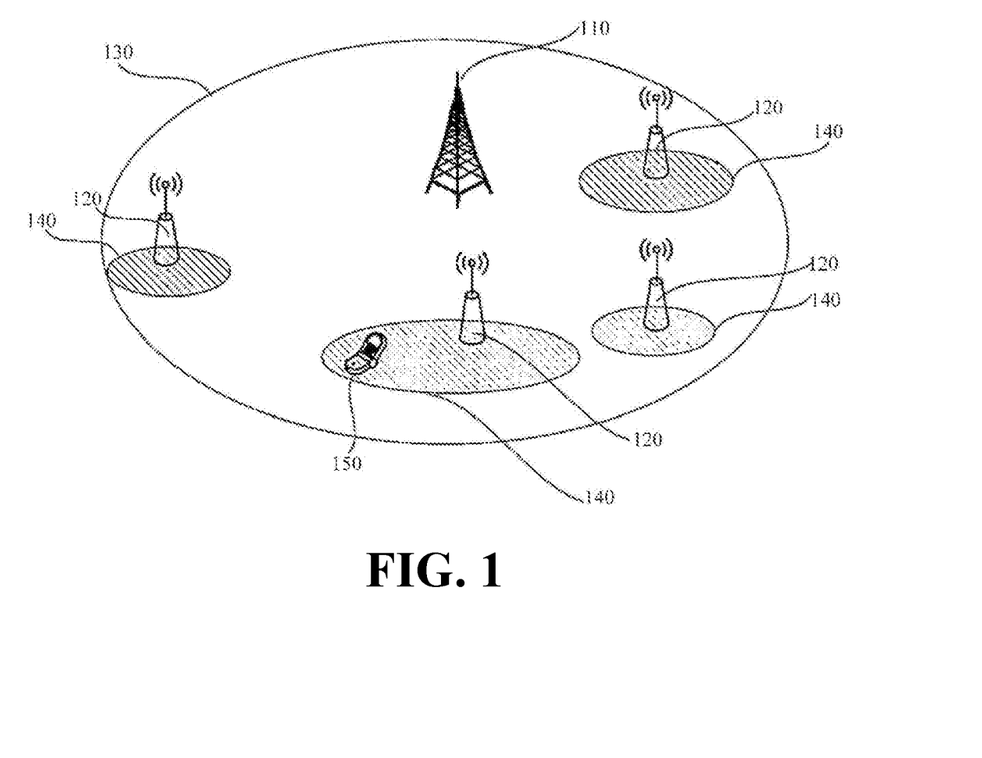
FIG. 1 is a schematic diagram of a network architecture provided by an implementation of the present application.

Refer to FIG. 1 that is a schematic diagram of a network architecture disclosed in an implementation of the present application. As shown in FIG. 1, the network architecture includes a master network node (master node, MN) 110 and at least one secondary network node (slave node, SN) 120. Herein the master node 110 provides basic network coverage 130, and the at least one secondary network node 120 provides relatively small network coverage 140. A user equipment (UE) 150 within both coverage of the network device 110 and the network device 120 can establish communication connections with the network device 110 and the network device 120 simultaneously. Here, a case where one user equipment 150 is simultaneously connected to one master network node 110 and at least one secondary network node 120 is referred to as Dual connectivity. In the following descriptions, various implementations of the present application will be described by taking the case where one user equipment 150 has a dual connectivity with one master network node 110 and one secondary network node 120 as an example. However, one skilled in the art can understand that solutions described below are also fully applicable to the case where one user equipment has a dual connectivity with one master network node and multiple secondary network nodes.

The user equipment (UE) is a device that provides voice and/or data connectivity to users, such as a handheld device or vehicle-mounted device with a wireless connection function. General user equipment includes, for example, a mobile phone, a tablet computer, a notebook computer, a palm computer, a mobile internet device (MID), a wearable device such as a smart watch, a smart bracelet, a pedometer.

The network node refers to a computer or another device connected to a network having an independent address and a function of transmitting or receiving data. The network node may be a workstation, a customer, network user or personal computer, as well as a server, a printer and another device connected to a network. Each workstation, server, user equipment and network device (which refers to a node device at a network side, including but not limited to, an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU), a Mobility Management Entity (MME), and the like), i.e., devices having their own unique network addresses, all are network nodes.

A data processing method provided by an implementation of the present application will be described in detail below with reference to the network architecture shown in FIG. 1.

In current discussion of New radio (NR), for a radio bearer configured with a data duplication and transmission function, the data duplication and transmission function of the radio bearer may be dynamically activated or de-activated through a Media Access Control (MAC) control element (CE).

For a case of dual connectivity, a master network node and a secondary network node may respectively send a MAC CE to activate or de-activate a data duplication and transmission function of a certain split bearer of a user equipment. It has been agreed that a MAC CE contains a bitmap and the size of the bitmap is 1 byte in the current discussion of the NR. Different positions in the bitmap respectively correspond to different bearer IDs of the user equipment. Bearers indicated by these bearer IDs are bearers configured with the data duplication and transmission function. For example, bearer IDs of a user equipment are 0, 2, 3, 7, 8, 10, and there is a corresponding relationship between the bitmap included in the MAC CE and the bearer IDs: a first bit in the bitmap corresponds to bearer ID 0, a second bit corresponds to bearer ID 2, a third bit corresponds to bearer ID 3, and a fourth bit corresponds to bearer ID 7, a fifth bit corresponds to bearer ID 8, a sixth bit corresponds to bearer ID 10, and a seventh bit and an eighth bit are invalid bits. The corresponding relationship between the bitmap included in the MAC CE and the bearer IDs is in an ascending order. Of course, the corresponding relationship between the bitmap included in the MAC CE and the bearer IDs may otherwise be in a descending order.

Since a MAC CE received by a user equipment may be issued by a master network node or a secondary network node, it is possible that in a protocol of the NR the user equipment is required to define a data duplication operation of the user equipment according to both the MAC CE issued by the master network node and the MAC CE issued by the secondary network node. When the user equipment receives Radio Resource Control (RRC) signaling, the user equipment should have an initial state. When the user equipment receives a MAC CE issued by one network node but does not receive a MAC CE issued by the other network node, the user equipment cannot define a data duplication operation of the user equipment according to the both MAC CEs issued by the two network nodes.

Figure 2:
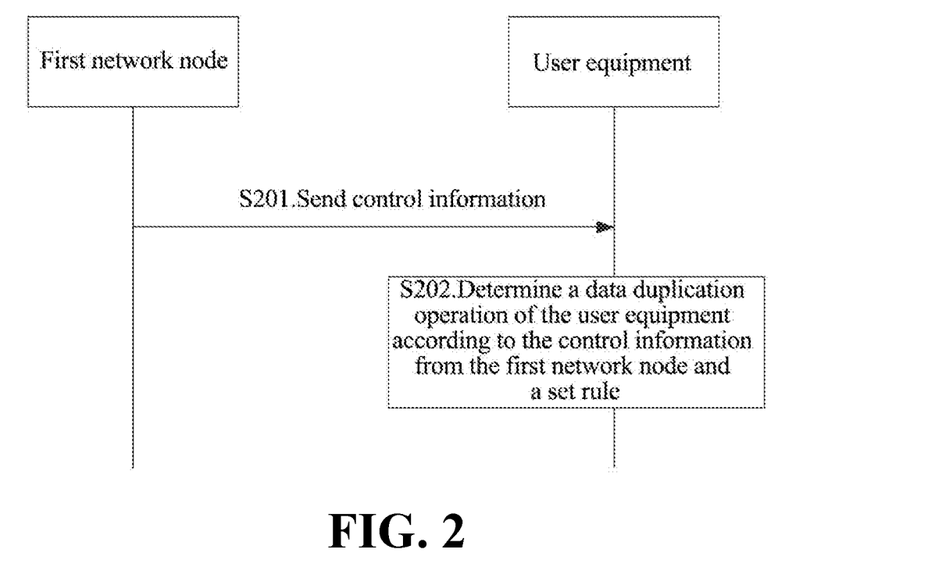
FIG. 2 is a schematic flow chart of a data processing method provided by an implementation of the present application.

To solve the above problem, refer to FIG. 2 that is a schematic flow chart of a data processing method provided by an implementation of the present application. The data processing method includes following acts S201 to S202.

In S201, a first network node sends control information to a user equipment.

In an implementation, a specific implementation for the first network node to send the control information to the user equipment includes: the first network node sends a MAC CE to the user equipment, the MAC CE including the control information.

Figure 3:
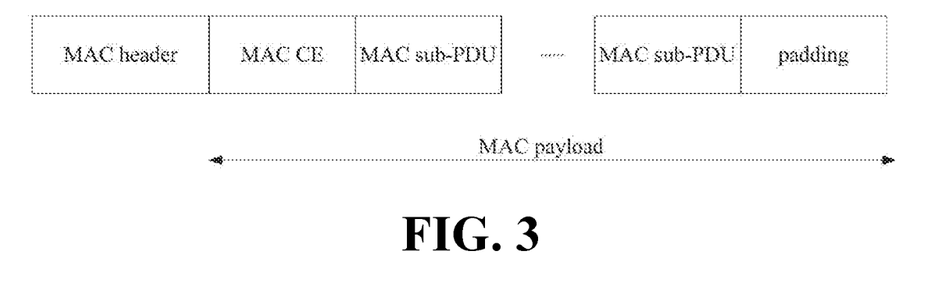
FIG. 3 is a schematic diagram of an overall structure of a MAC PDU provided by an implementation of the present application.

Specifically, an overall structure of a MAC PDU is shown in FIG. 3. A MAC PDU consists of a MAC header and a MAC payload. The MAC payload consists of MAC sub-protocol data units (MAC sub-PDUs), a MAC CE, and optional padding bits. When the MAC header, the MAC sub-PDU and the MAC CE cannot fully fill the entire MAC PDU, remaining bits in the MAC PDU need to be filled by padding bits. There are many types of MAC CEs for transmitting different control information of the MAC layer, such as a MAC CE for a Power Headroom Report, a MAC CE for a Buffer Status Report, and a MAC CE for sending a Timing Advance Command.

The MAC CE in the present application is used for controlling a data duplication and transmission function of a user equipment. An implementation for the first network node to send the MAC CE to the user equipment includes: when there is data to be sent to the user equipment in the first network node, a PDCP layer of the first network node encapsulates the data to be sent into a PDCP PDU, then sends the encapsulated PDCP PDU to a RLC layer, and the RLC layer sends an RLC PDU to a MAC layer. Then the MAC layer puts control information to be sent in a MAC CE, and encapsulates the MAC CE and the data sent by the RLC layer into a MAC PDU, and then the MAC layer of the first network node sends the encapsulated MAC PDU to the user equipment through an interface.

In S202, the user equipment receives the control information from the first network node, and the user equipment determines a data duplication operation of the user equipment according to the control information from the first network node and a set rule.

In the present application, the first network node may be a master network node or a secondary network node. A second network node may be a master network node or a secondary network node.

In an implementation, a specific implementation for the user equipment to receive the control information from the first network node includes: the user equipment receives a MAC CE from the first network node, the MAC CE including the control information.

Specifically, the MAC layer of the user equipment receives the MAC PDU sent by the MAC layer of the first network node, and the MAC layer of the user equipment demultiplexes the received MAC PDU to obtain the MAC CE included in the MAC PDU, that is, the MAC layer of the user equipment obtains the control information included in the MAC CE.

In the current discussion of the NR, for a case of dual connectivity, a master network node and a secondary network node may respectively send a MAC CE to activate or de-activate a data duplication function of a certain split bearer of a user equipment, and since the MAC CE received by the user equipment may be sent by the master network node or the secondary network node, it is possible that in a protocol of the NR the user equipment is required to define a data duplication operation of the user equipment according to both the MAC CE sent by the master network node and the MAC CE sent by the secondary network node. In addition, it has been agreed that a MAC CE includes a bitmap and the size of the bitmap is 1 byte in the current discussion of the NR. If a MAC CE includes control information, the control information may be information in this 1 byte included in the MAC CE.

Based on the above case, assuming a first network node transmits control information to a user equipment through a MAC CE. If the user equipment currently only receives one MAC CE sent by one of a master network node and a secondary network node, then as the user equipment does not receive a MAC CE sent by the other network node, the user equipment cannot define a data duplication operation of the user equipment according to the both MAC CEs sent by the two network nodes.

In regard to this problem, in an implementation, a specific implementation of the present application includes: a MAC CE includes control information, the MAC CE includes a bitmap, the size of the bitmap is 1 byte, and the control information includes at least one bit. A specific implementation for the user equipment to determine the data duplication operation of the user equipment according to the control information from the first network node and a set rule includes: the user equipment assumes a value of bit i, wherein the bit i is one of at least one bit included in control information which is assumed by the user equipment to be from a second network node; and the user equipment determines the data duplication operation of the user equipment according to the value of the bit i, a value of bit j and a set mapping relationship, wherein the bit j is one of at least one bit included in the control information from the first network node, and the bit i and the bit j have the same position in the control information.

In an implementation, the set mapping relationship is a mapping relationship among a value of one bit included in control information from the first network node, a value of one bit included in control information from the second network node, and a data duplication operation of the user equipment.

Herein, the set mapping relationship is shown in Table 1.

TABLE 1

| Bit from a first network node | Bit from a second network node | Operation of a UE |
| --- | --- | --- |
| 1 | 1 | Operation1 |
| 1 | 0 | Operation2 |
| 0 | 1 | Operation3 |
| 0 | 0 | Operation4 |

Herein, Operation1, Operation2 and Operation3 are the same, and are a data duplication behavior. Alternatively, Operation2, Operation3, and Operation4 are the same, and are a data non-duplication behavior.

For example, it is assumed that control information from the first network node includes 8 bits, and the 8 bits of the control information of the first network node are xx001101. Further it is assumed that a first bit corresponds to bearer ID 0 of the user equipment, a second bit corresponds to bearer ID 2 of the user equipment, a third bit corresponds to bearer ID 3 of the user equipment, a fourth bit corresponds to bearer ID 7 of the user equipment, a fifth bit corresponds to bearer ID 8 of the user equipment, a sixth bit corresponds to bearer ID 10 of the user equipment, and a seventh bit and an eighth bit are invalid bits. If the user equipment has already known control information from the second network node for the bearer ID 0, the bearer ID 2, the bearer ID 7 and the bearer ID 8, and in this case, the user equipment only does not know control information of the second network node for the bearer ID 3 and the bearer ID 10. In this case, the user equipment assumes values of bits corresponding to the bearer ID 3 and the bearer ID 10 among bits included in the control information from the second network node. For example, the user equipment assumes that the value of the bit corresponding to the bearer ID 3 is 1, then the user equipment may acquire that an operation of the user equipment for the bearer ID 3 is the data duplication behavior according to the Table 1, and that the value of the bit corresponding to the bearer ID 10 of the user equipment is 0, then the user equipment may acquire that an operation of the user equipment for the bearer ID 10 is the data non-duplication behavior according to the Table 1.

It can be seen that in the present application, in a case of dual connectivity, when a user equipment only receives a MAC CE of one network node, the user equipment assumes a value of a bit included in a MAC CE sent by the other network node, then the user equipment defines a data duplication operation of the user equipment according to a value of a bit included in the received MAC CE of the one network node, the assumed value of a bit included in the MAC CE of the other network node and a preset mapping relationship, thereby avoiding a situation that the user equipment cannot determine a data duplication operation due to reception of a MAC CE of one network node only.

In an implementation, the value of the bit i is assumed based on the value of the bit j.

Specifically, assuming the value of bit j is 1, the user equipment assumes the value of bit i is 1, or, assuming the value of bit j is 0, the user equipment assumes the value of bit i is 0. Alternatively, assuming the value of bit j is 1, the user equipment assumes the value of bit i is 0, or assuming the value of bit j is 0, the user equipment assumes the value of bit i is 1.

In an implementation, the control information includes at least one bit. Before the user equipment determines the data duplication operation of the user equipment according to the control information from the first network node and the set rule, the method further includes: the user equipment receives control information from the second network node; and determining, by the user equipment, the data duplication operation of the user equipment according to the control information from the first network node and the set rule, includes: the user equipment determines the data duplication operation of the user equipment according to a value of bit x, a value of bit y and a set mapping relationship, wherein the bit x is one of at least one bit included in the control information from the second network node received by the user equipment, the bit y is one of at least one bit included in the control information from the first network node, and the bit x and the bit y have the same position in the control information.

Specifically, in a case of dual connectivity, when the user equipment currently receives a MAC CE from one network node but does not receive a MAC CE from the other network node, for this case, the user equipment maintains a default state indicated by RRC signaling unchanged until a MAC CE from the other network node arrives, and then the user equipment defines the data duplication operation of the user equipment according to the both MAC CEs from the two network nodes.

Figure 4:
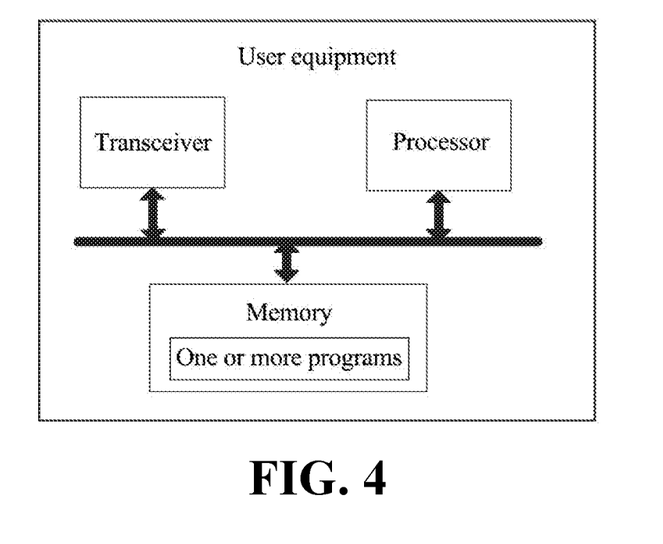
FIG. 4 is a schematic structural diagram of a user equipment provided by an implementation of the present application.

Refer to FIG. 4 that is a user equipment provided by an implementation of the present application. The user equipment includes one or more processors, one or more memories, one or more transceivers, and one or more programs. The one or more programs are stored in the one or more memories, and configured to be executed by the one or more processors.

The one or more programs include instructions for performing the following acts: receiving control information from a first network node; and determining a data duplication operation of the user equipment according to the control information from the first network node and a set rule.

In an implementation, the control information includes at least one bit, in an aspect of determining the data duplication operation of the user equipment according to the control information from the first network node and the set rule, the one or more programs include instructions specifically for performing the following acts: assuming a value of bit i, wherein the bit i is one of at least one bit included in control information which is assumed by the user equipment to be from a second network node; and determining the data duplication operation of the user equipment according to the value of the bit i, a value of bit j and a set mapping relationship, wherein the bit j is one of at least one bit included in the control information from the first network node, and the bit i and the bit j have the same position in the control information.

In an implementation, the value of the bit i is assumed based on the value of the bit j.

In an implementation, the control information includes at least one bit, before determining the data duplication operation of the user equipment according to the control information from the first network node and the set rule, the one or more programs further include instructions for performing the following acts: receiving control information from the second network node; in an aspect of determining the data duplication operation of the user equipment according to the control information from the first network node and the set rule, the one or more programs include instructions specifically for performing the following acts: determining the data duplication operation of the user equipment according to a value of bit x, a value of bit y and a set mapping relationship, wherein the bit x is one of at least one bit included in the control information from the second network node received by the user equipment, the bit y is one of at least one bit included in the control information from the first network node, and the bit x and the bit y have the same position in the control information.

In an implementation, the set mapping relationship is a mapping relationship among a value of one bit included in the control information from the first network node, a value of one bit included in the control information from the second network node, and a data duplication operation of the user equipment.

In an implementation, in an aspect of receiving the control information from the first network node, the one or more programs include instructions specifically for performing the following acts: receiving a MAC CE from the first network node, the MAC CE including the control information.

It should be noted that specific implementations of the content described in the implementation may refer to those of the above method and will not be described herein.

Figure 5:
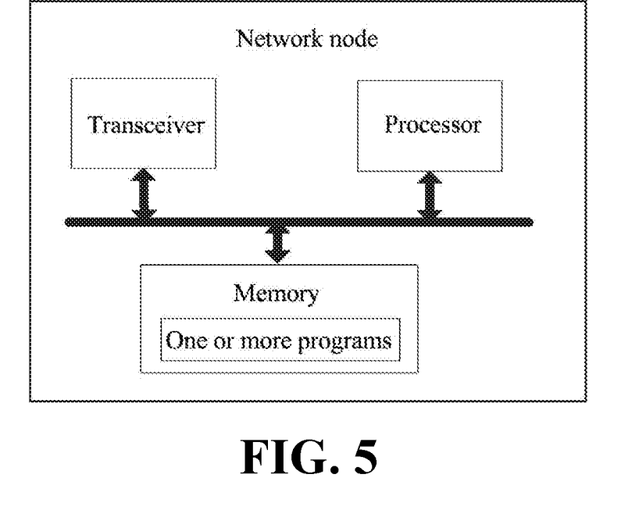
FIG. 5 is a schematic structural diagram of a network node provided by an implementation of the present application.

Refer to FIG. 5 that is a network node provided by an implementation of the present application. The network node includes one or more processors, one or more memories, one or more transceivers, and one or more programs. The one or more programs are stored in the one or more memories, and configured to be executed by the one or more processors.

The one or more programs include instructions for performing the following act: sending control information to a user equipment, wherein the control information is used for the user equipment to determine a data duplication operation of the user equipment in combination with a set rule.

In an implementation, in an aspect of sending the control information to the user equipment, the one or more programs include instructions specifically for performing the following act: sending a MAC CE to the user equipment, the MAC CE including the control information.

It should be noted that specific implementations of the content described in the implementation may refer to those of the above method and will not be described herein.

Figure 6:
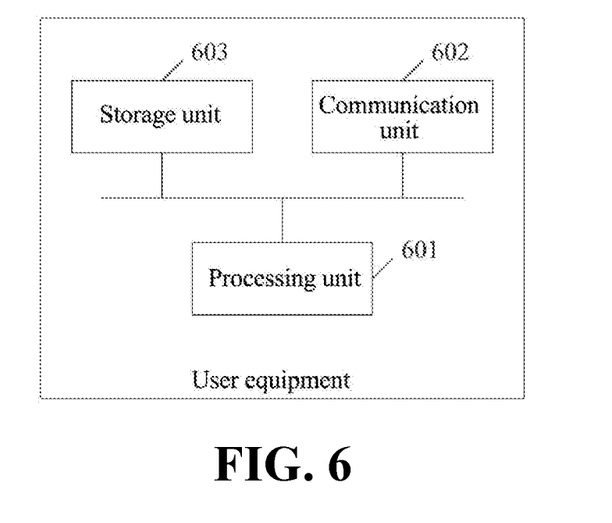
FIG. 6 is a schematic structural diagram of another user equipment provided by an implementation of the present application.

Refer to FIG. 6 that is a schematic structural diagram of a user equipment provided by an implementation of the present application. The user equipment includes a processing unit 601, a communication unit 602, and a storage unit 603.

The processing unit 601 is configured to receive control information from a first network node through the communication unit 602; and determine a data duplication operation according to the control information from the first network node and a set rule.

In an implementation, the control information includes at least one bit, in an aspect of determining the data duplication operation of the user equipment according to the control information from the first network node and the set rule, the processing unit 601 is specifically configured to assume a value of bit i, wherein the bit i is one of at least one bit included in control information which is assumed by the user equipment to be from a second network node; and determine the data duplication operation of the user equipment according to the value of the bit i, a value of bit j and a set mapping relationship, wherein the bit j is one of at least one bit included in the control information from the first network node, and the bit i and the bit j have the same position in the control information.

In an implementation, the value of the bit i is assumed based on the value of the bit j.

In an implementation, the control information includes at least one bit, the processing unit 601 is further configured to receive the control information from the second network node through the communication unit.

In an aspect of determining the data duplication operation of the user equipment according to the control information from the first network node and the set rule, the processing unit 601 is specifically configured to determine the data duplication operation of the user equipment according to a value of bit x, a value of bit y and a set mapping relationship, wherein the bit x is one of at least one bit included in the control information from the second network node received by the user equipment, the bit y is one of at least one bit included in the control information from the first network node, and the bit x and the bit y have the same position in the control information.

In an implementation, the set mapping relationship is a mapping relationship among a value of one bit included in the control information from the first network node, a value of one bit included in the control information from the second network node, and a data duplication operation of the user equipment.

In an implementation, in an aspect of receiving the control information from the first network node, the processing unit 601 is specifically configured to receive a MAC CE from the first network node, the MAC CE including the control information.

The processing unit 601 may be a processor or a controller (e.g., the processing unit 601 may be a Central Processing Unit (CPU), a general-purpose processor, a Digital Signal Processor (DSP), An Application-Specific Integrated Circuit (ASIC), a Field Programmable Gate Array (FPGA), or another programmable logic device, a transistor logic device, a hardware component, or any combination thereof. The processing unit 601 may implement or execute various illustrative logical blocks, modules, and circuits described in combination with disclosed contents of the present application. Or the processor may be a combination that implements computing functions, e.g., a combination that includes one or more microprocessors, a combination of a DSP and a microprocessor, etc.). The communication unit 602 may be a transceiver, a transceiving circuit, a radio chip, a communication interface, etc., and the storage unit 603 may be a memory.

When the processing unit 601 is a processor, the communication unit 602 is a communication interface, and the storage unit 603 is a memory, the user equipment involved in the implementations of the present application may be the user equipment shown in FIG. 4.

Figure 7:
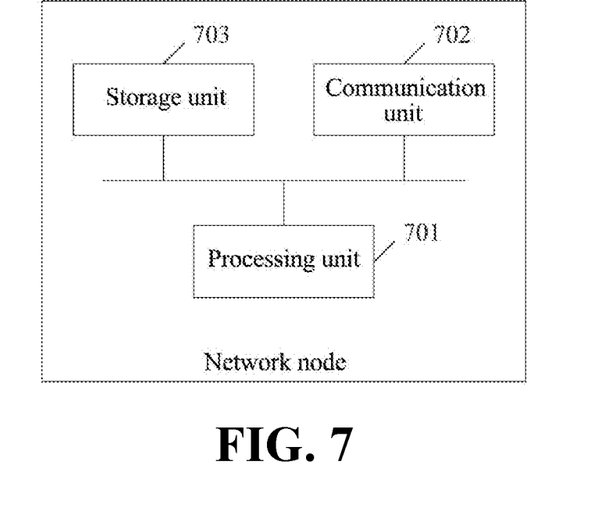
FIG. 7 is a schematic structural diagram of another network node provided by an implementation of the present application.

Refer to FIG. 7 that is a schematic structural diagram of a network node provided in the implementation. The network node includes a processing unit 701, a communication unit 702 and a storage unit 703.

The processing unit 701 is configured to send control information to a user equipment through the communication unit 702, wherein the control information is used for the user equipment to determine a data duplication operation of the user equipment in combination with a set rule.

In an implementation, in an aspect of sending the control information to the user equipment, the processing unit 701 is specifically configured to send a MAC CE to the user equipment, the MAC CE including the control information.

The processing unit 701 may be a processor or a controller (e.g., the processing unit 701 may be a Central Processing Unit (CPU), a general-purpose processor, a Digital Signal Processor (DSP), An Application-Specific Integrated Circuit (ASIC), a Field Programmable Gate Array (FPGA), or another programmable logic device, a transistor logic device, a hardware component, or any combination thereof. The processing unit 701 may implement or execute various illustrative logical blocks, modules, and circuits described in combination with disclosed contents of the present application. Or, the processor may be a combination that implements computing functions, e.g., a combination that includes one or more microprocessors, a combination of a DSP and a microprocessor, etc.). The communication unit 702 may be a transceiver, a transceiving circuit, a radio chip, a communication interface, etc., and the storage unit 703 may be a memory.

When the processing unit 701 is a processor, the communication unit 702 is a communication interface, and the storage unit 703 is a memory, the network node involved in the implementations of the present application may the network node shown in FIG. 5.

Figure 8:
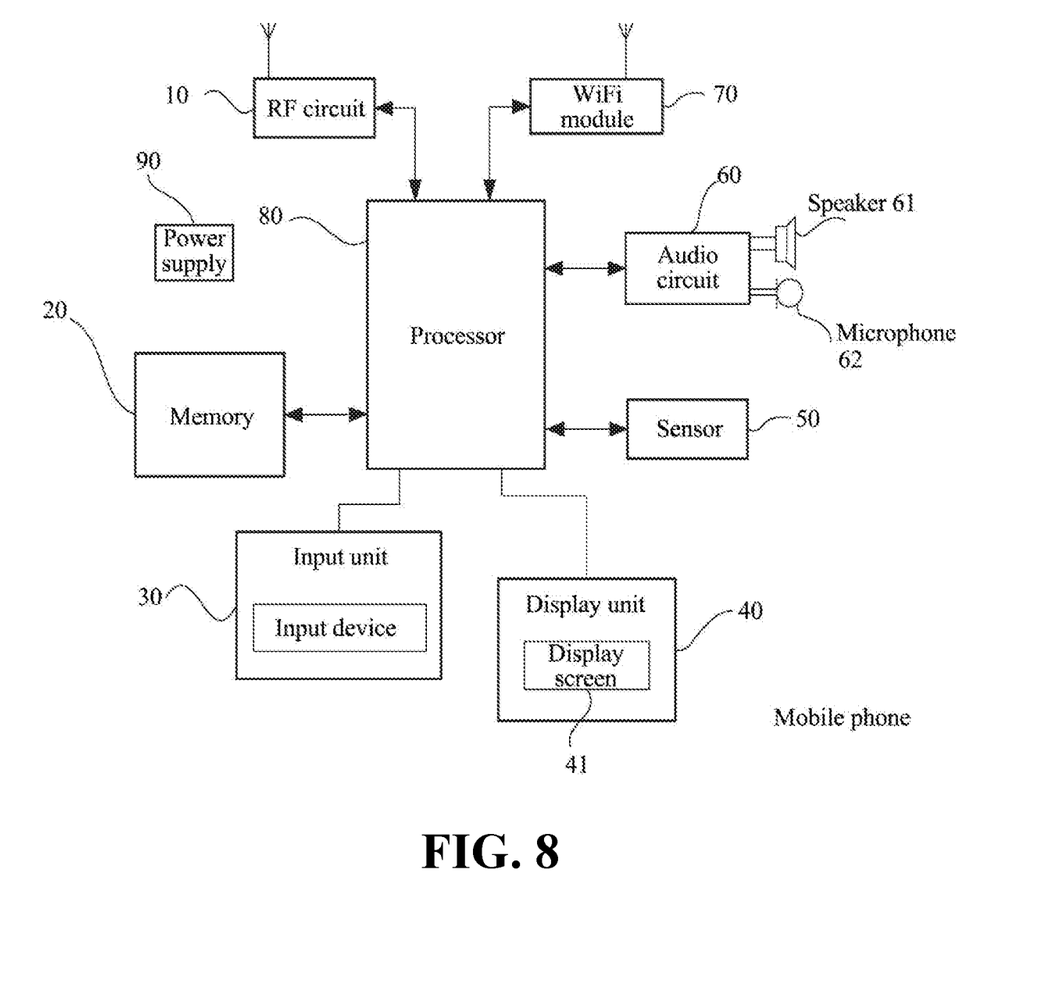
FIG. 8 is a schematic structural diagram of another user equipment provided by an implementation of the present application.

A user equipment is further provided in an implementation of the present application. As shown in FIG. 8, for ease of illustration, only parts related to implementations of the present application are shown, and the specific technical details which are not disclosed may refer to those of the methods of the implementations of the present application. An example in which the user equipment is a mobile phone is taken for description.

FIG. 8 shows a block diagram of a partial structure of a mobile phone related to a user equipment provided by an implementation of the present application. Referring to FIG. 8, the mobile phone includes parts such as a radio frequency (RF) circuit 10, a memory 20, an input unit 30, a display unit 40, a sensor 50, an audio circuit 60, a wireless fidelity (WiFi) module 70, a processor 80, and a power supply 90. A person skilled in the art can understand that the structure of the mobile phone shown in FIG. 8 does not constitute a limitation to the mobile phone, and the mobile phone may include more parts or fewer parts than those shown in the figure, or some parts combined, or a different part arrangement.

In the following, various composition parts of the mobile phone are specifically described with reference to FIG. 8.

The RF circuit 10 may be configured to receive and send information. Generally, the RF circuit 10 includes, but is not limited to, an antenna, at least one amplifier, a transceiver, a coupler, a Low Noise Amplifier (LNA), a duplexer, and the like. In addition, the RF circuit 10 may further communicate with a network and another device via wireless communication. The wireless communication may use any communication standard or protocol, which includes, but is not limited to, Global System for Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 20 may be configured to store software programs and modules, and the processor 80 runs the software programs and modules stored in the memory 20 to perform various functional applications and data processing of the mobile phone. The memory 20 may mainly include a program storage area and a data storage area. The program storage area may store an operating system, an application program required for at least one function, and the like. The data storage area may store data or the like created according to usage of the mobile phone. In addition, the memory 20 may include a high speed random access memory, and may further include a non-volatile memory, such as at least one magnetic disk storage device, a flash memory, or other volatile solid-state storage device.

The input unit 30 may be configured to receive input digital or character information, and generate key signal inputs related to user settings and function control of the mobile terminal. Specifically, the input unit 30 may include a fingerprint identification module component and other input devices. The fingerprint identification module component may collect fingerprint data inputted by the user thereon. Other input devices may include, but are not limited to, one or more of a touch control screen, a physical keyboard, a function key (for example, a volume control key, or a switch key), a track ball, a mouse, a joystick, and so on.

The display unit 40 may be configured to display information input by the user or information provided for the user, and various menus of the mobile phone. The display unit 40 may include a display screen 41. Optionally, the display screen 41 may be configured by adopting a Liquid Crystal Display (LCD), an Organic Light-Emitting Diode (OLED), or the like.

The mobile phone may further include at least one sensor 50, such as an optical sensor, a motion sensor or other sensor. Specifically, the optical sensor may include an ambient light sensor and a proximity sensor, wherein the ambient light sensor may adjust luminance of the display screen 41 according to brightness of the ambient light, and the proximity sensor may turn off the display screen 41 and/or backlight when the mobile phone is moved near the ear. As one type of the motion sensor, an acceleration sensor may detect magnitudes of accelerations in various directions (generally triaxial directions), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap), and the like. Other sensors, for example, a gyroscope, a barometer, a hygrometer, a thermometer, and an infrared sensor, which may be further configured in the mobile phone are not described repeatedly herein.

An audio circuit 60, a speaker 61, and a microphone 62 may provide audio interfaces between the user and the mobile phone. The audio circuit 60 converts received audio data into electrical signals, then transmits the converted electrical signals to the speaker 61, and after that the speaker 61 converts the converted electrical signals into sound signals for playing. On the other hand, the microphone 62 converts collected sound signals into electrical signals, the electrical signals are received by the audio circuit 60 and converted into audio data, and after the audio data is processed by the processor 80, the processed audio data is sent to another mobile phone via the RF circuit 10, or the processed audio data is played to the memory 20 for further processing.

WiFi is a short-range wireless transmission technology. The mobile phone may help users to send and receive e-mails, browse web pages and access streaming media and the like through the WiFi module 70. The WiFi module 70 provides users with wireless broadband Internet access. Although FIG. 8 shows the WiFi module 70, it can be understood that, the WiFi module 70 is not an essential part of the mobile phone, and may be completely omitted as required without changing the essence of the present invention.

The processor 80 is a control center of the mobile phone, and connects various parts of the whole mobile phone by using various interfaces and circuits. By running or executing software programs and/or modules stored in the memory 20 and invoking data stored in the memory 20, the processor 80 performs various functions of the mobile phone and processes data, thereby performing overall monitoring on the mobile phone. Optionally, the processor 80 may include one or multiple processing units. Preferably, the processor 80 may integrate an application processor and a modulation and demodulation processor, wherein the application processor mainly processes an operating system, a user interface, an application program, and so on, and the modulation and demodulation processor mainly processes wireless communication. It can be understood that, the foregoing modulation and demodulation processor may be not integrated into the processor 80.

The mobile phone further includes the power supply 90 (such as a battery) for supplying power to various parts. Preferably, the power supply may be logically connected to the processor 80 by using a power management system, thereby implementing functions such as charging, discharging, and power consumption management through the power management system.

Although not shown in the figure, the mobile phone may further include a camera, a Bluetooth module, and the like, which are not further described herein.

In the foregoing implementations shown in FIG. 2, the flow at the user equipment in each act method may be implemented based on the structure of the mobile phone.

In the foregoing implementations shown in FIG. 6, the function of each unit may be implemented based on the structure of the mobile phone.

An implementation of the present application further provides a computer readable storage medium. The computer readable storage medium stores a computer program for electronic data interchange, and the computer program causes a computer to perform parts or all of the acts described for the user equipment in the above method implementations.

An implementation of the present application further provides a computer readable storage medium. The computer readable storage medium stores a computer program for electronic data interchange, and the computer program causes a computer to perform parts or all of the acts described for the network node in the above method implementations.

An implementation of the present application further provides a computer program product. The computer program product includes a non-transitory computer readable storage medium storing a computer program, and the computer program is operable to cause a computer to perform parts or all of the acts described for the user equipment in the above methods. The computer program product may be a software installation package.

An implementation of the present application further provides a computer program product. The computer program product includes a non-transitory computer readable storage medium storing a computer program, and the computer program is operable to cause a computer to perform parts or all of the acts described for the network node in the above method implementations. The computer program product may be a software installation package.

The acts of the method or algorithm described in the implementations of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the flows or functions according to the implementations of the present application are generated in whole or in parts. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The purposes, technical solutions and benefits of the implementations have been described in details in the above specific implementations. It should be understood that the above is only the specific implementations of implementations of the present application, and is not used to limit the protection scope of implementations of the present application. Any modification, equivalent substitution, improvement and the like, made on the basis of technical solutions of implementations of the present application shall be included in the protection scope of implementations of the present application.

I claim:

1. A data processing method, comprising:
   receiving, by a user equipment, control information from a first network node; and
   determining, by the user equipment, a data duplication operation of the user equipment according to the control information from the first network node and a set rule, wherein the control information comprises at least one bit, and
   wherein determining, by the user equipment, the data duplication operation of the user equipment according to the control information from the first network node and the set rule, comprises assuming, by the user equipment, a value of bit i, wherein the bit i is one of at least one bit included in control information which is assumed by the user equipment to be from a second network node; and determining, by the user equipment, the data duplication operation of the user equipment according to the value of the bit i, a value of bit j and a set mapping relationship; wherein the bit j is one of at least one bit included in the control information from the first network node, and the bit i and the bit j have the same position in the control information; or wherein before determining, by the user equipment, the data duplication operation of the user equipment according to the control information from the first network node and the set rule, the method further comprises receiving, by the user equipment, control information from a second network node, wherein determining, by the user equipment, the data duplication operation of the user equipment according to the control information from the first network node and the set rule comprises determining, by the user equipment, the data duplication operation of the user equipment according to a value of bit x, a value of bit y and a set mapping relationship, wherein the bit x is one of at least one bit included in the control information from the second network node received by the user equipment, the bit y is one of at least one bit included in the control information from the first network node, and the bit x and the bit y have the same position in the control information.

2. The method of claim 1, wherein the value of the bit i is assumed based on the value of the bit j.

3. The method of claim 1, wherein the set mapping relationship is a mapping relationship among a value of one bit included in the control information from the first network node, a value of one bit included in the control information from the second network node, and a data duplication operation of the user equipment.

4. The method of claim 1, wherein receiving, by the user equipment, the control information from the first network node comprises:
receiving, by the user equipment, a Media Access Control (MAC) Control Element (CE) from the first network node, wherein the MAC CE comprises the control information.

5. A user equipment comprising a processor and a communication interface;
wherein the processor is configured to receive control information from a first network node through the communication interface, and determine a data duplication operation of the user equipment according to the control information from the first network node and a set rule;
wherein the control information comprises at least one bit; and
wherein the processor is specifically configured to assume a value of bit i, wherein the bit i is one of at least one bit included in control information which is assumed by the user equipment to be from a second network node, and determine the data duplication operation of the user equipment according to the value of the bit i, a value of bit j and a set mapping relationship; wherein the bit j is one of at least one bit included in the control information from the first network node, and the bit i and the bit j have the same position in the control information; or wherein the processor is further configured to receive control information from a second network node through the communication interface, and in an aspect of determining the data duplication operation of the user equipment according to the control information from the first network node and the set rule, the processor is specifically configured to determine the data duplication operation of the user equipment according to a value of bit x, a value of bit y and a set mapping relationship, wherein the bit x is one of at least one bit included in the control information from the second network node received by the user equipment, the bit y is one of at least one bit included in the control information from the first network node, and the bit x and the bit y have the same position in the control information.

6. The user equipment of claim 5, wherein the value of the bit i is assumed based on the value of the bit j.

7. The user equipment of claim 6, wherein the set mapping relationship is a mapping relationship among a value of one bit included in the control information from the first network node, a value of one bit included in the control information from the second network node, and a data duplication operation of the user equipment.

8. The user equipment of claim 6, wherein the processor is specifically configured to receive a Media Access Control (MAC) Control Element (CE) from the first network node, wherein the MAC CE comprises the control information.

9. The user equipment of claim 5, wherein the set mapping relationship is a mapping relationship among a value of one bit included in the control information from the first network node, a value of one bit included in the control information from the second network node, and a data duplication operation of the user equipment.

10. The user equipment of claim 9, wherein the processor is specifically configured to receive a Media Access Control (MAC) Control Element (CE) from the first network node, wherein the MAC CE comprises the control information.

11. The user equipment of claim 5, wherein the processor is specifically configured to:
receive a Media Access Control (MAC) Control Element (CE) from the first network node, wherein the MAC CE comprises the control information.

* * * * *